United States Patent
Messinger

(10) Patent No.: US 9,631,673 B2
(45) Date of Patent: Apr. 25, 2017

(54) STATIONARY BEARING RACE WITH UNIFORM DISTRIBUTION OF WEAR

(71) Applicant: Samuel Messinger, Ramot Bet Shemish (IL)

(72) Inventor: Samuel Messinger, Ramot Bet Shemish (IL)

( * ) Notice: Subject to any disclaimer, the term of this patent is extended or adjusted under 35 U.S.C. 154(b) by 0 days.

(21) Appl. No.: 14/833,703

(22) Filed: Aug. 24, 2015

(65) Prior Publication Data

US 2017/0058957 A1   Mar. 2, 2017

(51) Int. Cl.
| F16C 41/00 | (2006.01) |
| F16C 33/66 | (2006.01) |
| F16C 19/06 | (2006.01) |
| F16C 43/06 | (2006.01) |

(52) U.S. Cl.
CPC ........ *F16C 41/004* (2013.01); *F16C 33/6659* (2013.01); *F16C 19/06* (2013.01); *F16C 43/06* (2013.01)

(58) Field of Classification Search
CPC ..... F16C 19/55; F16C 41/004; F16C 33/6659
See application file for complete search history.

(56) References Cited

U.S. PATENT DOCUMENTS

| 777,684 A | 12/1904 | Date |
| 820,232 A | 5/1906 | Messinger et al. |
| 893,257 A | 7/1908 | Messinger |
| 1,152,829 A | 9/1915 | Messinger |
| 1,161,501 A | 11/1915 | Messinger |
| 1,338,031 A | 4/1920 | Messinger |
| 1,675,369 A | 7/1928 | Messinger |
| 1,774,655 A | 9/1930 | Messinger |
| 1,812,109 A | 6/1931 | Messinger |
| 1,956,648 A | 5/1934 | Messinger |
| 1,960,708 A | 5/1934 | Loomis |
| 2,050,725 A | 8/1936 | Messinger |
| 2,064,352 A | 12/1936 | Messinger |
| 2,152,556 A | 3/1939 | Messinger |
| 2,273,129 A | 2/1942 | Messinger |
| 2,336,412 A | 6/1942 | Messinger |
| 2,354,870 A | 8/1944 | Messinger |
| 2,388,925 A | 11/1945 | Messinger |
| 2,403,292 A | 7/1946 | Messinger |
| 2,426,320 A | 8/1947 | Messinger |
| 2,430,359 A | 11/1947 | Messinger |
| 2,456,883 A | 12/1948 | Messinger et al. |
| 2,486,719 A | 12/1948 | Messinger et al. |
| 2,518,159 A * | 8/1950 | Martin .................. F16C 19/54 310/90 |
| 2,565,570 A | 8/1951 | Messinger |
| 2,574,979 A | 11/1951 | Messinger |

(Continued)

*Primary Examiner* — Thomas R. Hannon
(74) *Attorney, Agent, or Firm* — Blank Rome LLP; Michael C. Greenbaum; Tara L. Marcus

(57) ABSTRACT

A load bearing system with controlled movement of a stationary bearing race to distribute load and wear over the load bearing surface and increase bearing life. The system includes an inner race and an outer race which are predictably rotatable relative to one another about an axis. The system uses oil holes and other holes to place balls and spring loaded ball assemblies to facilitate movement as well as gears strategically placed in the stationary race with timer mechanisms to rotate the races relative to one another as desired.

22 Claims, 3 Drawing Sheets

(56) References Cited

U.S. PATENT DOCUMENTS

| | | | |
|---|---|---|---|
| 2,628,503 A | 11/1951 | Messinger | |
| 2,607,641 A | 8/1952 | Messinger | |
| 2,634,878 A | 4/1953 | Messinger et al. | |
| 2,661,545 A | 12/1953 | Messinger | |
| 2,674,222 A | 4/1954 | Messinger et al. | |
| 2,693,262 A | 11/1954 | Messinger | |
| 2,829,842 A | 4/1958 | Messinger | |
| 2,901,189 A | 8/1959 | Conway et al. | |
| 3,361,501 A | 1/1968 | Messinger et al. | |
| 3,547,503 A * | 12/1970 | Konet | F16C 19/55 310/114 |
| 3,671,093 A * | 6/1972 | Wieck | F16C 19/55 384/461 |
| 4,067,626 A | 1/1978 | McElwain | |
| 4,915,512 A | 4/1990 | Hilby et al. | |
| 6,616,338 B2 | 9/2003 | Tibbits | |
| 7,164,265 B2 | 1/2007 | Giai et al. | |
| 9,062,660 B2 * | 6/2015 | Wheals | F16C 19/38 |
| 2002/0054719 A1 | 5/2002 | Takizawa et al. | |

* cited by examiner

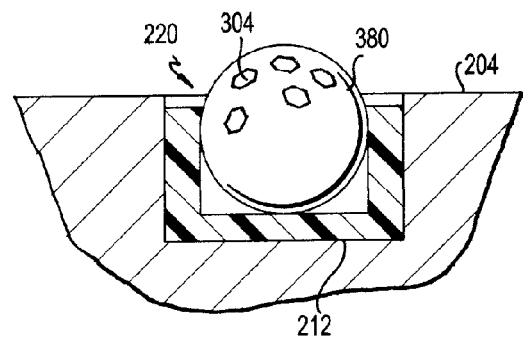
FIG. 2D
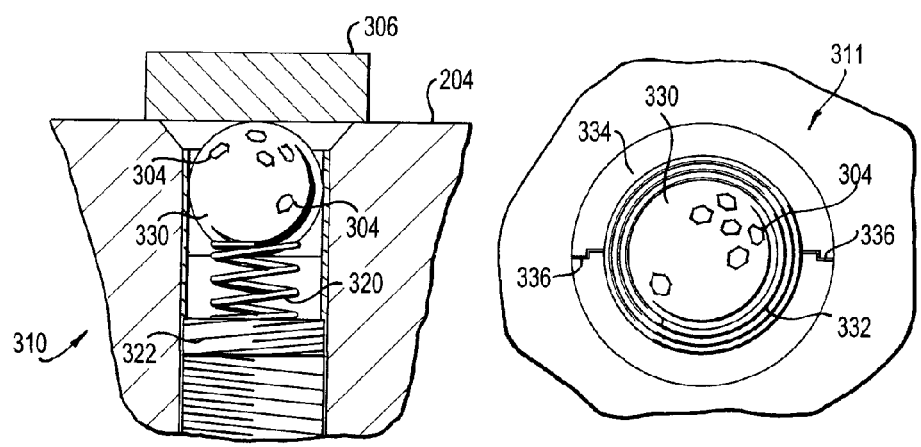
FIG. 3A
FIG. 3B
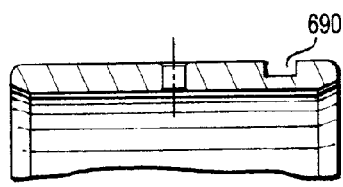
FIG. 4
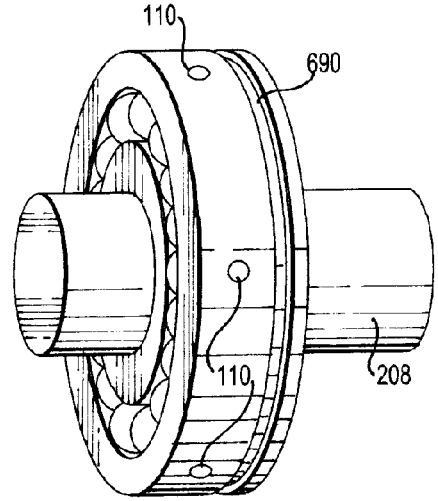
FIG. 5

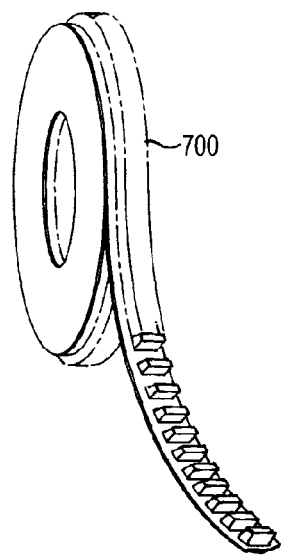
FIG. 6
FIG. 7
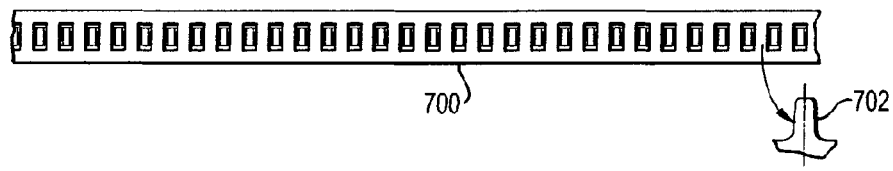
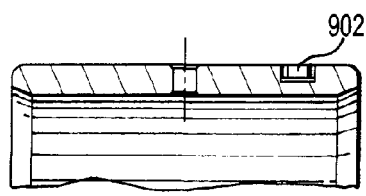
FIG. 8
FIG. 9
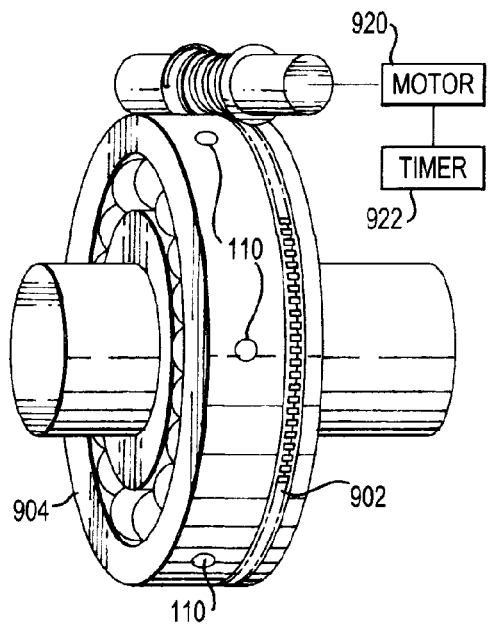

STATIONARY BEARING RACE WITH UNIFORM DISTRIBUTION OF WEAR

TECHNICAL FIELD

The present disclosure generally relates to the field of bearings, and more particularly to distributing the load of bearing elements evenly over stationary bearing races to increase bearing life.

BACKGROUND OF INVENTOR

The Inventor Samuel (Betzalel) Messinger worked in a bearing manufacturing firm started by his grandfather Samuel (Betzalel) Messinger at the turn of the 20$^{th}$ century as a blacksmith farrier shop. In 1914, he incorporated a company known as Hydraulic Tool Works, Inc., which was later renamed Messinger Bearings, Inc. Messinger Bearings was widely credited within the industry as an innovator, which is now documented in the academic report *Open versus closed innovation: Development of the wide strip mill for steel in the USA during the* 1920's by Jonathan Aylen, Manchester Institute of Innovation Research, MBS Harold Hankins Building, University of Manchester, Manchester M13 9PL, England. That Report documents the Messinger contribution to design and manufacturing rooted in Hydraulic Tool Works. Also, the Cal Tech Bruce H. Rule Papers 1933-1989, document the "Palomar 200" telescope engineering work by the company. Messinger family members active in the business were issued a first US patent in 1904 (777,684). Others quickly followed (820,232) issued in 1906, (893,257) issued in 1908, and numerous additional US bearing and bearing related patents, such as U.S. Pat. Nos. 1,338,031; 1,675,369; 1,774,655; 1,152,829; 1,161,501; 1,812,109; 1,956,648; 1,960,708; 2,050,725; 2,064,352; 2,152,556; 2,273,129; 2,336,412; 2,354,870; 2,388,925; 2,403,292; 2,426,320; 2,430,359; 2,456,883; 2,565,570; 2,486,719; 2,574,979; 2,607,641; 2,628,503; 2,634,878; 2,661,545; 2,674,222; 2,693,262; 2,829,842; 2,901,189; and 3,361,501. Also, the Inventor has issued patents and applications filed in a wide range of disciplines. The Inventor was raised in the factory setting at an early age and worked in each and every department of Messinger Tool Works, Inc, and Messinger Bearings, Inc. as a child and as an hourly employee and was schooled to operate and calibrate each production specialty machine. Later, he was employed in the engineering department and assigned production responsibilities. Among his duties were to disassemble, inspect, examine and repair/re-machine/regrind bearings returned from the field having exposure to all types of service which led to disclosures embodied in this application.

BACKGROUND OF THE DISCLOSURE

Generally, a bearing arrangement includes an outer ring and an inner ring. The radially inner ring part and the radially outer ring part are rotatable relative to one another about an axis of the rotary bearing. Rolling bodies, such as balls or rollers, are arranged between the outer ring and inner ring. The rollers are available in a variety of forms like, uniform cylinders, barrels or cones, depending upon the application. For as long as there have been bearings, there has been an effort to predict the life of the bearing. Bearing life prediction traces back to a 1927 paper by Palmgren which lacked principal subsurface shear stress. This developed into a 1947 Lundberg-Palmgren disclosure for comprehensive bearing life that established modern day metrics which included work by Weibull.

Most engineers, including the Inventor, were steeped in the Dynamic Capacity of Roller Bearings Volume 96 of Acta Polytechnic from Royal Swedish Academy of Engineering Sciences 1952. In this landmark publication the formulas for remanufacturing of bearings were detailed as follows:

Bearing life is considered as the period until the first sign of fatigue appears. The bearing life is a function of the number of revolutions performed by the bearing and the magnitude of load [6 to 9]. Fatigue is the result of shear stress cyclically appearing immediately below the load carrying surface of the ring(s) and rolling elements (FIG. 3 and equation 1).

$$\ln\frac{1}{S} \approx \frac{N^c \tau_0^c a l}{z_0^{h-1}} \left(1 - \frac{\tau_u}{\tau_0}\right)^c$$

S survival probability [%]
N number of load cycles
$\tau_0$ maximum orthogonal shear stress [Pa]
$\tau_u$ fatigue limit shear stress [Pa]
$z_0$ depth of maximum orthogonal shear stress [m]
a contact semi-axis in transverse direction [m]
l length of raceway contact [m]
e Weibull exponent
c, h exponents in the stress-life equation.

After a time, these repetitive stresses are mostly confined to a localized area in the stationary race and cause cracks underneath the surface that gradually extend to the surface. As the rolling elements pass over the cracks, fragments of the material break away. This is known as spalling.

With few exceptions, all bearing life data are taken with a rotating and a stationary race. There have been incremental increases in bearing life as manufacturing, design and metallurgy knowledge and technique have improved over the decades, but the fundamental application remains the same: one rotating race and one stationary race.

The present state of the art allows for a stationary race and a moving race in most applications. This causes uneven wear in the stationary race and results in bearing failure, expensive downtime and often service and replacement of entire systems in a production line of machinery. Tibbits discloses, in U.S. Pat. No. 6,616,338, entitled Extended Load Zone Bearing, using eccentric annular races to increase life. There are other disclosures, such as U.S. Pat. No. 4,067,626, to McElwain, with an elliptical inner race.

A unique feature of rolling bodies is that their useful life is not determined by wear, but rather by fatigue of their operating surfaces due to repeated stresses associated with use. It is generally accepted that fatigue failure of rolling element bearings occurs as a result of spalling, a progressive flaking or pitting of the surfaces of the rolling bodies and the surfaces of the corresponding bearing races. This flaking and pitting causes the rolling elements to seize, thereby generating intense heat, pressure and friction. Much of this starts from subsurface shear forces due to repetitive stresses in the non-rotating member over the same load bearing area.

Traditional design has the stationary race encountering repetitive loads over less than one third of the roller track, precipitating wear and failure. There are patents which monitor race movement, such as Hilby, U.S. Pat. No. 4,915, 512, entitled Thrust Bearing with Magnetic Sensor, Giai, U.S. Pat. No. 7,164,265, entitled Bearing Assembly with Rotation Sensing Device and Takizawa, US Patent Publication No. 2002/0054719A1, entitled Rolling Bearing Device and Ring With Sensor for the Rolling Bearing Device. However, there are no disclosures that initiate race movement to expose an otherwise virgin roller/ball/load pathway to the load zone and to distribute wear, stress and fatigue metrics.

In light of the aforementioned discussion, there still exists a need for a rotary bearing systems arrangement with controlled movement of the stationary race to distribute wear over the entire raceway and increase bearing life by initiating and controlling stationary race movement

BRIEF SUMMARY OF THE INVENTION

The following presents a simplified summary of the disclosure in order to provide a basic understanding to the reader. This summary is not an extensive overview of the disclosure and it does not necessarily identify key/critical elements of the disclosure or delineate the scope of the disclosure. Its sole purpose is to present some concepts disclosed herein in a simplified form as a prelude to the more detailed description that is presented later.

Exemplary embodiments of the present disclosure are directed towards a controlled rotary bearing system arrangement using lubricant passages (oil holes) to initiate and control race movement.

An exemplary objective of the present disclosure is to increase the bearing life and extend time intervals for maintenance down time, for example on large journals paper machinery or other large machinery. The increased bearing life achieved through the use of the elements of this disclosure is achieved without any additional tooling or machine modification.

According to an exemplary embodiment, the system includes an inner race and an outer race with a shaft located inside the bearing assembly and the inner race configured on the shaft. The races are predictably rotatable relative to one another about an axis.

According to an exemplary embodiment, the system includes a plurality of holes which may be included in the inner race and/or the outer race or combination thereof for facilitating race movement in the stationary race. Existing holes, such as oil holes, are modified with spring loaded ball assemblies. Additional shallow holes may be added for ball assembly inserts without compromising the design integrity of the load bearing surfaces. Holes may be round and not round. In addition, grooves may be strategically placed about the races to facilitate movement. Either the inner or the outer race may be the stationary race.

According to an exemplary embodiment, the system includes a plurality of rolling elements located in the oil holes of the stationary race, wherein a ball with dimples allows lubricant oils to pass from one side of the race to the other while pressure is exerted by a spring loaded assembly on the race housing or shaft to facilitate movement.

According to an exemplary embodiment, the system may also include a gear groove machined into the stationary or outer race with a gear tack welded or secured by epoxy or other adhesive onto the surface to move the stationary race. The gear is attached to a pinion gear and timer to move the stationary race as desired.

According to an exemplary embodiment, the system may also include a gear machined into the stationary race, such as a single or double enveloping worm gear. The gear is attached to a pinion gear and timer to move the stationary race as desired.

According to an exemplary embodiment, the system includes one or more springs loaded with one or more rolling elements located in the oil holes of the stationary race for the controlled movement of the stationary race.

According to an exemplary embodiment, the system includes the assembled bearing installed into a rigid structure such as a pillow block. The preloaded rolling elements of the stationary outer race located in the oil holes of the outer race exert outward force on the rigid block and create a deflection of the outer race to facilitate movement or rotation.

BRIEF DESCRIPTION OF THE DRAWINGS

Other objects and advantages of the present disclosure will become apparent to those skilled in the art upon reading the following detailed description of the preferred embodiments, in conjunction with the accompanying drawings, wherein like reference numerals have been used to designate like elements, and wherein:

FIG. 2C-2D are diagrams depicting a rolling element assembly in a stationary outer race, according to an exemplary embodiment of the present disclosure;

FIG. 3A-3B are diagrams depicting arrangements of a spring loaded ball assembly having bottom screw torque and top screw torque in an oil hole of a stationary race, according to an exemplary embodiment of the present disclosure;

FIG. 4 is a diagram of a cross section of a stationary outer race with a grove machined into the outside diameter;

FIG. 5 is a diagram of an assembled bearing on a shaft with a grove machined into the outside diameter circumference of the outer race;

FIG. 6 is a diagram of a coil of metal or carbon composite gear tape having gear teeth to apply to the groove shown in FIG. 4;

FIG. 7 is a diagram of a top view of a piece of the gear tape of FIG. 6, showing the configuration of a gear tooth;

FIG. 8 is a diagram of a cross section of a stationary outer race with a gear or rotation track machined into the circumference; and FIG. 9 is an assembled bearing on a shaft with an external drive gear, motor and timer and with a gear ring machined into the outside diameter circumference.

DETAILED DESCRIPTION OF THE DISCLOSURE

Figure 1:
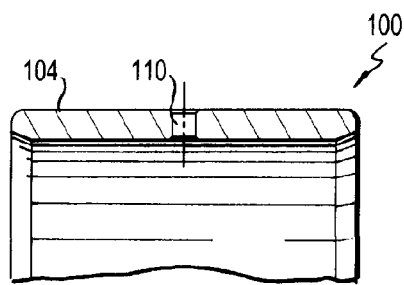
FIG. 1 is a diagram depicting an outer race of a prior art bearing. The outer race 104 has a hole 110 which is a typical port for lubrication of the bearing. Usually, these holes are located at 90 degrees to each other, with a typical race having 4 such holes.

It is to be understood that the present disclosure is not limited in its application to the details of the construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of the terms "first", "second", and "third", and the like, herein do not denote any order, quantity or importance, but rather are used to distinguish one element from another.

Figure 2A:
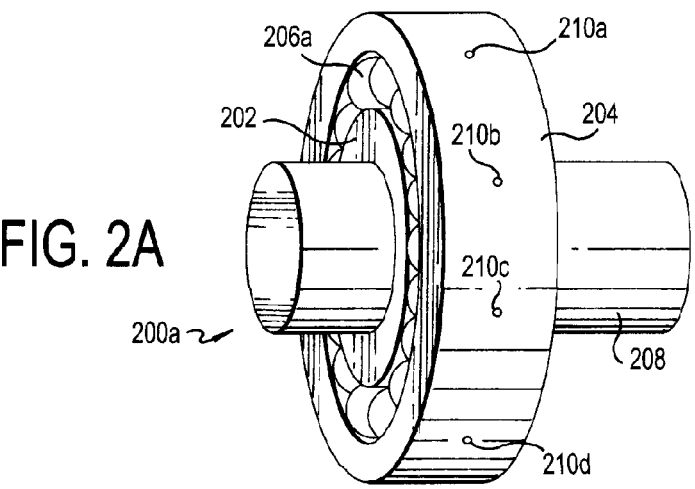
FIG. 2A-2B are diagrams depicting an arrangement of rotary bearing systems for reducing friction, according to an exemplary embodiment of the present disclosure.
Figure 2B:
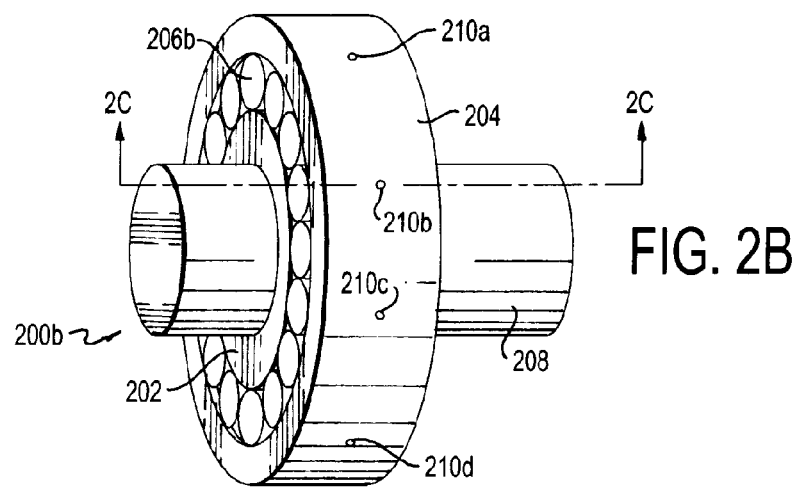

Referring now to FIG. 2A-2B, there is shown rotary bearing systems 200a and 200b, depicting two arrangements of rotary bearing systems to reduce friction and increase the bearing life, according to an exemplary embodiment of the present disclosure. Bearing system 200a is constructed with spherical elements 206a, while bearing system 200b is constructed with roller elements 206b. Other types of elements, such as spherical bushings may be used where there is a need to facilitate even distribution of wear on load surfaces of load bearing systems. The bearing systems 200a and 200b include an inner race 202, an outer race 204, rolling elements 206a, 206b, and a shaft 208.

According to a non-limiting exemplary embodiment of the present disclosure, the inner race 202 and the outer race 204 of the bearing system 200a, 200b are predictably rotatable relative to one another about an axis. Wear is distributed over the outer race 204 to reduce spalling or flaking of the race. The two races 202, 204 may have recesses 210a-210n which extend partially into the races 202, 204 to house a ball assembly to facilitate movement of one race relative to the other race (see FIG. 2C-2D). Usually, there is a 0.0762 mm to 0.127 mm (0.003" to 0.005") clearance in the outer race 204, but no movement. The rolling elements 206a, 206b are included in between the inner race 202 and the outer race 204. The rolling elements may be spherical elements 206a, cylindrical elements 206b, or tapered rollers or spherical bushings or other elements, without limiting the scope of the present disclosure. The shaft 208 is located inside the bearing system 200a, 200b and the inner race 202 is configured on the shaft 208. The shaft 208 rotates along the axis of the inner race 202. The outer race 204 has four oil holes 110 which are usually equally spaced about its circumference (three such oil holes 110 are shown, for example, in FIG. 5 and FIG. 9) in which one or more of which may be fitted with spring loaded balls to facilitate movement. Additional holes may be added as desired without compromising the structural integrity of the load bearing surfaces. The oil holes 110 do not need to be equally spaced about the circumference of the outer race 204. Also, there could be oil holes 110 in addition in the inner race 202, or only exclusively in the inner race 202. Calculations using Lames Thick Wall Cylinder formula will indicate the amount of force needed to initiate stationary race movement. The formula and explanation for this may be found in Strength of Materials, Part 2 Advanced Theory and Problems by Prof S. Timoshenko. It should be noted that as part of the disclosure herein, either the outer or the inner race can be configured as the stationary race, although the outer race 204 is more commonly the stationary race.

Figure 2C:
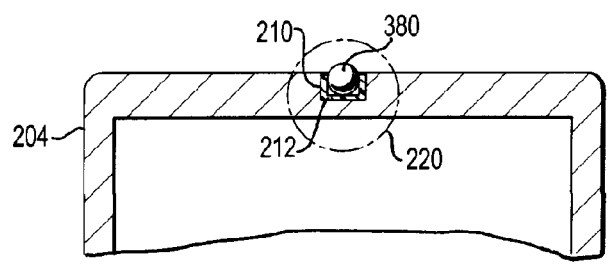

Referring to FIG. 2C-2D, there is shown shallow hole 210, ball housing 212 and rolling element or ball 380 depicting a rolling element assembly 220 according to an exemplary embodiment of the present disclosure. The rolling element 380 is inserted in a ball housing 212 by, for example, using a plastic head hammer so that it is a snap fit to keep the ball 380 in the ball housing 212. The rolling element 380 is sized so as to extend outwards to facilitate the movement of the outer or stationary race 204. The ball housing 212 may be made up of materials like bronze, brass, or other suitable materials, without limiting the scope of the present disclosure. The ball housing 212 is itself ball peened into the hole 210, using a plastic head hammer, for example similar to the assembly of the ball 380 into the ball housing 212. An offset cam rotary tool is used to close the vertical opening of the ball housing 212 to create a cage retaining envelope for the ball(s). One or more or pairs of such shallow holes 210 may be disposed about the circumference of the outer race 204 or the inner race, 202, whichever is the stationary race. Preferably, the shallow holes 210 are deployed in one or more pairs and are disposed equidistantly around the circumference of the outer race 204, or inner race 202, but may be located as desired. The holes 210 are shallow, are drilled before hardening of the race and have any sharp edges removed. After grinding, a circular snug fit ball housing 212 is ball peened into place. Then a ball 380 is hammered into the open ball housing 212 with a ball peen plastic hammer. The balls 380 extend out by 0.0254 mm to 0.0508 mm (0.001" or 0.002"), just enough to exert pressure on the bearing housing or pillow block 306 shown in FIG. 3, in the case of the stationary outer race 204. When the rolling element assembly is deployed in the shallow holes 210 in the inner race 202, the balls 380 would be pressing against the shaft 208. Assembly of the rolling element assembly 220 in the inner or outer race is accomplished by first ball peening the ball housing 212 into the hole 210. Then, the ball 380 is ball peened into the ball housing 212 after the vertical opening of the ball housing 212 has been narrowed to secure the ball 380. If desired, the balls 380 may have dimples 304 on their surfaces to allow lubricants to flow into the ball housing 212 to provide lubrication of the rolling element assembly 220. This embodiment may be used with the timer 922 controlled rotational motor and gears 920 described previously for precise movement of the stationary race.

Referring to FIG. 3A, there is shown a diagram depicting an arrangement of the spring loaded dimple ball assembly 310 which may be inserted into one or more oil holes 110 of the stationary outer race 204, according to an exemplary embodiment of the present disclosure. FIG. 3A shows a side view of a bottom spring loaded assembly 310, that is preloaded by a screw 322 from the bottom, which is inserted into the oil holes 110 to promote movement. As shown in FIG. 3B, a top spring loaded assembly 311 may alternatively be screwed and spring loaded from the top of the ball 330, rather than from the bottom as shown in FIG. 3A.

Referring further to FIG. 3A, there is shown a bottom spring loaded screw assembly 310 installed in a constrained state. The bottom spring loaded screw assembly 310 is formed by a spring 320 and screw 322, which loads the spring 320 against the roller element or ball 330. The bearing housing or pillow block 306 represents a pillow block or bearing housing into which the spring loaded ball assembly 310 is inserted. Depending on the application, the top spring loaded ball assembly 311 or the bottom spring loaded assembly 310 may be a snug fit or a loose fit. Each assembly 310, 311 is preloaded by a torque wrench for the calculated force needed to facilitate rotation of the stationary race. The torque wrench slots 336 are shown in FIG. 3B in connection with the top spring loaded ball assembly 311. According to a non-limiting exemplary embodiment, the spring loaded dimple ball insert assembly 310 of FIG. 3A exerts outward force on the bearing housing or pillow block 306 to create a deflection of the stationary outer race 204 to allow it to move or rotate relative to the non-stationary inner race 202. This embodiment may be used with the timer 922 controlled rotational motor and gears 920 described previously for precise movement of the stationary race.

In FIG. 3B, there is shown a drawing of a variation of the spring loaded ball assembly 310 in which that assembly is instead top spring loaded (shown as element 311 in FIG. 3B). The spring 320 is located under the ball 330, as shown in FIG. 3A, and rests on the flat circular portion of the spring loaded ball assembly 311. In that embodiment, a torqueing ring 334 is provided with torqueing slots 336 which are used by a torque wrench to rotate the torqueing ring 334 in the threads 332, thereby adjusting the preloading of the spring loaded ball 330 from the top. In that manner, the loading of the assembly 311 can be accomplished without removing the top spring loaded assembly 311 from the oil hole 110. The amount of deflection needed may be calculated, but the top loaded spring assembly 311 embodiment provides flexibility for installation in the field.

According to a non-limiting exemplary embodiment of the present disclosure, the rolling elements 330 may have dimples 304 on their surfaces to allow lubricants to flow in either direction when the oil holes 110 are being used for additional functions and the spring loaded ball assembly 310, 311 is designed to facilitate the flow of lubricant.

According to a non-limiting exemplary embodiment of the present disclosure, individual spring loaded ball assemblies 310, 311 as shown in FIG. 3A-3B or tandem versions thereof may be used to facilitate movement of the stationery outer race 204. Alternatively, one or more of the rolling element assemblies 220 as shown in FIG. 2D can be used. Finally, one or more of the individual (or tandem version thereof) spring loaded ball assemblies 310, 311 can be used together with one or more of the rolling element assemblies 220 in the stationery outer race 204, depending on costs and other factors, such as access to an installed bearing, bearing design, etc.

According to a non-limiting exemplary embodiment of the present disclosure, individual spring loaded ball assemblies 310, 311 as shown in FIG. 3A-3B or tandem versions thereof may be used to facilitate movement of the stationary outer race 204. Alternatively, one or more of the rolling element assemblies 220 as shown in FIG. 2D can be used. Finally, one or more of the individual (or tandem version thereof) spring loaded ball assemblies 310, 311 can be used together with one or more of the rolling element assemblies 220 in the stationary outer race 204, depending on costs and other factors, such as access to an installed bearing, bearing design, etc.

According to a non-limiting exemplary embodiment of the present disclosure, as shown in FIG. 4 and FIG. 5, the stationary outer race 204 may be rotated as desired by placing a groove 690 in the outside diameter of the outer race 204 upon which a metal or carbon composite gear strip 700 can be attached via epoxy or by tack welding. FIG. 6 shows a coil of strip gear 700 in roll form for just such use, while FIG. 7 shows a top view of the strip 700 and a side view of one of the teeth 702.

According to a non-limiting exemplary embodiment of the present disclosure, as shown in FIG. 8 and FIG. 9, the stationary outer race 204 may alternatively be rotated as desired by machining a gear 902 in the outside diameter upon which a single or double enveloping gear is mated to move the stationary race as desired. Alternatively, such a gear may be machined in the side surface 904 of the stationary outer race 204. The single or double enveloping gear drive 920 may be a Globoid gear drive available from ZAKGEAR (www.zakgear.com). It will be readily apparent to those of ordinary skill in the art how to apply the gear drive and motor and timer mechanisms discussed above to drive the stationary race. The timer 922 can be internally programmed or externally controlled, in order to actuate the gear drive and motor 920 to rotate the stationary outer race 204 when desired. As will also be readily apparent to those of ordinary skill in the art, the timer 922 can be remotely operated via a wireless communications link or can be hardwired to a controller.

Although the present disclosure has been described in terms of certain preferred embodiments and illustrations thereof, other embodiments and modifications to preferred embodiments may be possible that are within the principles and spirit of the disclosure. The above descriptions and figures are therefore to be regarded as illustrative and not restrictive. For example, the inner race 202 can be configured as the stationary race and may contain shallow holes 210 into which are mounted one or more rolling element assemblies 220. Inner races 202 often have oil holes 110 and can be used to receive the spring loaded ball assemblies 310, 311.

Thus the scope of the present disclosure is defined by the appended claims and includes both combinations and sub combinations of the various features described herein above as well as variations and modifications thereof, which would occur to persons of ordinary skill in the art upon reading the foregoing description.

What is claimed is:

1. A rotary bearing system comprising:
inner and outer races which are rotatable relative to one another about an axis, said inner and outer races having bearing elements located in a rolling space between said inner and outer races;
at least one lubrication hole in the outer race for distributing lubricant oils;
at least one preloaded rolling element located in at least one of the lubrication holes of the outer race; and
a bearing housing securing the outer race and adjacent to the at least one preloaded rolling element in at least one of the lubrication holes of the outer race to exert outward force on the bearing housing and create a deflection of the outer race to move or rotate relative to said inner race.

2. The system of claim 1, wherein the outer race further comprises a gear for moving the outer race relative to the inner race.

3. The system of claim 2, further comprising a gear drive and a timer for intermittently moving said outer race.

4. The system of claim 2, wherein the gear is one of machined into the inner or outer race or is affixed in a groove machined into said inner or outer race.

5. The system of claim 1, wherein said at least one preloaded rolling element includes a spherical element with at least one dimple to allow lubricant oils to pass from one side of the race to another to enable the bearing elements to roll freely in the rolling space.

6. The system of claim 1, wherein the inner race further comprises a gear for moving the inner race relative to the outer race and a gear drive and a timer are connected to said gear for intermittently moving said inner race.

7. The system of claim 1, further comprising at least one recess extending partially into said inner or outer race, said at least one recess including a rotatable rolling element.

8. The system of claim 7, wherein said rotatable rolling element is carried by a ball housing which is secured in said at least one recess extending partially into said outer race.

9. The system of claim 7, wherein said at least one recess is round.

10. The system of claim 7, wherein said at least one recess is not round.

11. The system of claim 1, wherein said bearing system comprises at least two lubrication holes located around the circumference of the outer race and said at least two lubrication holes each contain a preloaded rolling element.

12. A rotary bearing system comprising:
inner and outer races which are rotatable relative to one another about an axis, said inner and outer races having bearing elements located in a rolling space between said inner and outer races, and one of said inner and outer races being configured as a stationary race and the other of said inner and outer races being configured as a non-stationary race;
at least one lubrication hole included in the stationary race for distributing lubricant oils;
at least one recess extending partially into said stationary race, said at least one recess including a rotatable rolling element; and
a bearing housing securing the outer race and adjacent to the at least one preloaded rolling element in at least one of the lubrication holes of the stationary race to exert outward force on the bearing housing and create a deflection of the stationary race to move or rotate relative to said non-stationary race.

13. The system of claim 12, wherein the stationary race further comprises a gear for moving the stationary race relative to the non-stationary race.

14. The system of claim 13, further comprising a gear drive and a timer for intermittently moving said stationary race.

15. The system of claim 13, wherein the gear is one of machined into the stationary race or is affixed in a groove machined into said stationary race.

16. The system of claim 12, wherein said rotatable rolling element is carried by a ball housing which is secured in said at least one recess extending partially into said stationary race.

17. The system of claim 12, wherein said bearing system comprises at least two recesses extending partially into said stationary race, said at least two recesses each including a rotatable rolling element and wherein said at least two recesses are located equidistantly around the circumference of the stationary race.

18. The system of claim 12, further comprising at least one preloaded rolling element located in at least one of the lubrication holes.

19. A method of providing a rotary bearing assembly in which a first race is able to predictably rotate relative to a second race in order to distribute wear on the rotary bearing assembly, comprising the steps of:
assembling first and second races which are rotatable relative to one another about an axis, said first and second races having bearing elements located in a rolling space between said first and second races, one of said first and second races being stationary and the other race being non-stationary relative to each other;
providing at least one lubrication hole in one of said first and second races for distributing lubricant oils;
forming at least one recess extending partially into at least one of said first and second races, said at least one recess including a rotatable rolling element; and
mounting said rotary bearing assembly to a bearing housing such that said at least one preloaded rolling element in at least one of the lubrication holes exerts outward force on the bearing housing, creating a deflection of the stationary race to move or rotate relative to said non-stationary race.

20. The method of claim 19, further comprising the step of providing a gear in the stationary race for moving the stationary race relative to the non-stationary race.

21. The method of claim 19, further comprising the step of securing a ball housing in said at least one recess extending partially into said stationary race for carrying said rotatable rolling element.

22. The method of claim 19, further comprising the step of providing a gear in the stationary race for moving the stationary race relative to the non-stationary race.

* * * * *